United States Patent
Morden et al.

(10) Patent No.: US 7,463,368 B2
(45) Date of Patent: Dec. 9, 2008

(54) LASER PROJECTION SYSTEM, INTELLIGENT DATA CORRECTION SYSTEM AND METHOD

(75) Inventors: Jarrad V. Morden, Waterloo (CA); Kurt D. Rueb, Kitchener (CA)

(73) Assignee: Metris Canada Inc, Ontario (CA)

( * ) Notice: Subject to any disclaimer, the term of this patent is extended or adjusted under 35 U.S.C. 154(b) by 644 days.

(21) Appl. No.: 11/039,462

(22) Filed: Jan. 19, 2005

(65) Prior Publication Data

US 2005/0121422 A1 Jun. 9, 2005

Related U.S. Application Data

(63) Continuation-in-part of application No. 10/913,842, filed on Aug. 6, 2004.

(60) Provisional application No. 60/501,885, filed on Sep. 10, 2003.

(51) Int. Cl.
*G01B 11/14* (2006.01)

(52) U.S. Cl. ....................................... 356/614

(58) Field of Classification Search ......... 356/601–640; 382/154; 250/55.9, 559.22, 559.21; 702/150–155
See application file for complete search history.

(56) References Cited

U.S. PATENT DOCUMENTS

| | | | |
|---|---|---|---|
| 5,381,258 A * | 1/1995 | Bordignon et al. | 359/202 |
| 5,646,859 A | 7/1997 | Petta et al. | |
| 5,661,667 A * | 8/1997 | Rueb et al. | 702/95 |
| 5,671,053 A | 9/1997 | Wigg et al. | |
| 5,742,385 A | 4/1998 | Champa | |
| 6,170,163 B1 * | 1/2001 | Bordignon et al. | 33/16 |
| 6,480,271 B1 | 11/2002 | Cloud et al. | |
| 6,501,543 B2 | 12/2002 | Hedges et al. | |
| 6,535,282 B2 | 3/2003 | Hedges et al. | |
| 2003/0033041 A1 * | 2/2003 | Richey | 700/98 |
| 2005/0102050 A1 * | 5/2005 | Richey | 700/97 |

FOREIGN PATENT DOCUMENTS

EP 1288754 A2 5/2003

OTHER PUBLICATIONS

U.S. Appl. No. 60/501,885, filed Sep. 20, 2003, Rueb, et al.
U.S. Appl. No. 10/913,842, filed Aug. 6, 2004, Rueb et al.
Constellation[3D-I] 071502 Indoor GPS Technology For Metrology ARCSECOND, Copyright 2002 ARC Second, Inc.

(Continued)

*Primary Examiner*—Tarifur R. Chowdhury
*Assistant Examiner*—Isiaka O Akanbi
(74) *Attorney, Agent, or Firm*—Howard & Howard Attorneys, P.C.

(57) ABSTRACT

A laser projection system, intelligent data correction system and method which corrects for differences between the as-built condition and the as-designed condition of a workpiece which includes determining the as-built condition of a workpiece with a digitizer scanner and modifying data of the as-built condition or the data of a laser projection based upon the data received from the digitizer scanner of the as-built condition. A preferred intelligent data correction system includes metrology receivers fixed relative to the digitizer scanner and the workpiece and a metrology transmitter to determine the precise location and orientation of the digitizer scanner relative to the workpiece.

26 Claims, 5 Drawing Sheets

OTHER PUBLICATIONS

RapidformXO 3D Scanning Applications www.rapidform.com Oct. 11, 2004.

Accurex Company High-Accuracy 3-Dimensional Measurement Systems and Services www.accurexmeasure.com Oct. 19, 2004.

Raindrop Geomagic Products Computer Aided Inspection Software www.geomatic.com Oct. 11, 2004.

Maya Metrix 3D CAD-to-Part Inspection Using Imageware Inspect; Geometric Verification and Dimensional Analysis www.mayametrix.com Oct. 11, 2004.

* cited by examiner

LASER PROJECTION SYSTEM, INTELLIGENT DATA CORRECTION SYSTEM AND METHOD

RELATED APPLICATION

This application is a continuation-in-part of U.S. patent application Ser. No. 10/913,842, filed Aug. 6, 2004, which claims priority to U.S. Provisional Patent Application Ser. No. 60/501,885, filed Sep. 10, 2003.

FIELD OF THE INVENTION

This invention relates to a laser projection system, an intelligent data correction system and method of projecting a laser image or template on a target workpiece, wherein the laser projection system and method corrects for discrepancies between the target workpieces as-designed condition and the target workpieces as-built condition.

BACKGROUND OF THE INVENTION

Visible laser projection systems are now widely used in the industry to project a laser outline, laser image or laser template on a target surface or workpiece for assembling large two or three-dimensional structures or assemblies, such as prefabricated roof trusses and aerospace composite components. By precisely characterizing the laser projector and establishing the exact relative position of the laser projector to the assembled structure, composite or target workpiece, the laser projection system is capable of accurately producing a laser image or template at precisely known coordinates on a target surface or workpiece which may be planar or curvilinear. For example, U.S. Pat. No. 5,646,859 assigned in part to the assignee of this application discloses a method and apparatus for defining a laser template for assembling a structure, such as a prefabricated roof truss. The method and apparatus disclosed in this patent includes a laser projector or a plurality of laser projectors mounted above a work surface, a plurality of sensors or laser targets fixed at predetermined locations on or adjacent the work surface, a computer and a sensor on the laser projector. The laser projector periodically or continuously scans the laser targets and the reflected light from the laser targets to the sensor of the laser projector determines the precise projection angle associated with the center of each laser target datum. Using a series of mathematical algorithms, the precise position and orientation of the laser projector relative to the work surface or workpiece is then calculated by the computer. The spatial information, in conjunction with a known display list or data stored in the computer allows the laser projector to generate accurate laser templates or laser images on the target surface. The laser projector may be fixed relative to the work surface or for larger assemblies, a plurality of laser projectors may be used or the laser projectors may be moved relative to the work surface as disclosed in the above-referenced patent.

Alignment and calibration methods similar to the above provide the accuracy needed for a wide range of laser projection applications. A typical accuracy specification is ±0.015 inches at a 10 to 15 foot stand-off of the laser projector when measured perpendicular to the laser beam. This approach allows good flexibility in positioning the laser projectors because the mounting location can be arbitrarily selected so long as a sufficient number of known laser target locations are detectible within the field of view of the laser projector which, as set forth above, must be located at a predetermined location on or adjacent the target surface. In a typical application, a minimum of four laser targets must be located by the sensor system (laser target and sensor) to establish the position of the laser projector relative to the assembled structure or part and the target surface.

3D digitizer scanners or 3D digitizing systems are also commercially available which projects patterns of light on a target surface, part or assembly in rapid sequence and a digital camera records these patterns and the images are then processed by combined Gray Code/Phase shift technique to compute a dense cloud of three dimensional coordinates for the surface of the part being measured. A conventional 3D digitizing system includes one or more digital cameras and generally includes a source of light, typically a white light, which may be rigidly mounted or mounted on a robot arm or the like. The digital scanner produces an accurate dense point cloud of the target surface, part or assembly which can be used for reverse engineering applications, inspection or the like. However, the digital scanner also requires photogrammetry targets at predetermined known locations on the target surface, part or assembly to determine the precise position and orientation of the digital scanner relative to the target surface, part or assembly.

Pending U.S. patent application Ser. No. 10/913,842 filed Aug. 6, 2004 assigned to the assignee of this application discloses a method and apparatus for independently determining a position and orientation of a target surface or workpiece using an external metrology device, such as an indoor global positioning system as disclosed, for example, in U.S. Pat. Nos. 6,501,543 and 6,535,282, eliminating the requirement for laser targets on the workpiece within the field of view of the laser projectors. The laser projectors are mounted on or in a frame assembly having a plurality of metrology receivers and metrology receivers are positioned on or adjacent the workpiece at predetermined known positions, such that a metrology transmitter can determine the precise location and orientation of the laser projectors relative to the workpiece in three dimensions. This method and apparatus may then be used to very accurately project a laser image or laser template on a large workpiece, such as an aircraft, and permits relative movement of the workpiece and the laser projectors.

As will be understood by those skilled in this art, a conventional laser projection system includes one or more laser projectors, a computer, and a laser control file or laser image file to be projected on the workpiece at predetermined precise locations on the workpiece. This laser control file is generated using data in the "as-designed" condition of the workpiece, such as an aircraft, and is used to "steer" the laser projector(s) above the workpiece to generate a three dimensional template for painting insignias, placement of decals, assist mechanical assembly, or build up composite parts. However, in certain applications, the "as-built" condition of the workpiece differs from the "as-designed" condition to such a degree that the laser image projected by the laser projector(s) will not be positioned correctly on the workpiece. For example, an aircraft may be modified during assembly by extending the length or other modifications may be made which require correction of the data of the as-designed condition for accurate positioning of the laser image on the workpiece in the as-built condition. This can be a serious problem particularly, but not exclusively, for larger workpieces subject to modification to accommodate customer requirements.

The laser projection system including an intelligent data correction system and method of this invention solves this problem by comparing the data of the as-designed condition to the as-built condition of the workpiece and modifying the data in the computer of the as-designed condition as required for accurate placement of the laser image or images on the workpiece in the as-built condition without requiring laborious input of further data of each modification to the workpiece made during assembly.

SUMMARY OF THE INVENTION

As set forth above, the intelligent data correction system with a laser projection system and method of this invention modifies or "corrects" the data stored in the computer associated with the laser projection of the as-designed condition of the workpiece to provide for accurate projection of a laser image or template on the workpiece in the as-built condition. The laser projection system including an intelligent data correction system of this invention comprises a digitizing system or digital scanner, preferably a 3D digital scanner, which determines the as-built condition of the workpiece, a computer receiving data of an as-designed condition of the workpiece and receiving data from the digitizing system of the as-built condition of the workpiece, and/or data of the laser projection to be projected on the target workpiece based upon the as-designed condition of the target workpiece. The computer then compares the data of the as-built condition of the target workpiece with the data of the as-designed condition of the target workpiece and modifies or "morphs" the data to correspond to the data of the as-built condition of the workpiece. That is, the computer receives data of the as-built condition of the target workpiece from the digitizing system and a data file either of the as-designed condition of the target workpiece, the laser projection to be projected on the target workpiece based upon the as-designed condition of the workpiece or both, depending upon the application. In some applications, all that will be required is to import the data of the laser projection based upon the as-designed condition for correction of the laser projection. However, in one preferred embodiment, the computer receives data of the as-designed condition of the workpiece and compares the data of the as-built condition of the workpiece received from the digitizing system and corrects or morphs the data of the as-designed condition of the workpiece. The data of the as-designed condition of the workpiece and the data of the laser projection to be projected on the workpiece may be the same file. Finally, the laser projector projects a laser image or laser template on the target surface based upon the data received from the computer regarding the as-built condition of the target workpiece. The laser image or laser template is thus accurately positioned on the target workpiece based upon the as-built condition of the workpiece without requiring laborious input of further data to the computer of the modifications made to the target workpiece.

In a preferred embodiment of the laser projection system of this invention, the digitizing system or digital scanner is mounted on a frame assembly opposite the target workpiece and the frame assembly includes a plurality of metrology receivers receiving a signal from a metrology transmitter to determine a precise location and orientation of the digitizing system or scanner in three dimensions. In a more preferred embodiment, the frame assembly of the digital scanner includes a plurality of reflective targets or photogrammetry targets opposite the digital camera to determine the precise position and orientation of the digital scanner relative to the frame, permitting movement of the digital scanner and frame relative to the target surface or workpiece. Further, in a preferred embodiment of the laser projection system, metrology receivers are also located at predetermined known locations relative to the target workpiece to determine a precise position and orientation of the digitizing system or scanner relative to the workpiece in three dimensions. The laser projector may also be mounted on a frame assembly opposite the target workpiece which includes a plurality of metrology receivers receiving a signal from the metrology transmitter to determine a precise position and orientation of the laser projector relative to the 3D digitizing system and the target workpiece, such that laser targets do not have to be located at predetermined locations within a field of view of the laser projector as described in the above-referenced co-pending patent application. Thus, the entire laser projection system including the digitizing scanning system may be "targetless." In one preferred embodiment of the laser projection system described above, the 3D digitizing system is a white light camera based digitizing scanner system. However, other digitizing scanner systems may also be used, including frequency modulated coherent laser radar devices, accordian fringe interferometer devices, other camera based scanner systems and contacting or probing digitizing systems.

In a preferred embodiment, the method of projecting a laser image on a target workpiece of this invention based upon the as-built condition of the target workpiece thus comprises first determining an as-built condition of the target workpiece with a digitizing system preferably by scanning the target workpiece and storing this information in a computer, preferably a computer associated with the laser projector. The computer may then compare the data of the as-built condition of the workpiece with data of the as-designed condition of the workpiece previously stored and modifies or corrects the data of the as-designed target workpiece to the data of the as-built condition of the target workpiece. Alternatively, the data of the laser projection based upon the as-designed condition may be sufficient. As set forth above, the method of this invention also includes storing data in the computer of a laser image to be projected on the target workpiece based upon the as-designed condition of the target workpiece and the computer then modifies the data of the laser image based upon the corrected data regarding the as-built condition of the target workpiece. Finally, the method of this invention includes controlling the laser projector to project a laser image at the predetermined location or locations and orientation on the target workpiece based upon the corrected data received from the computer of the as-built condition of the workpiece. Thus, the method of this invention correctly and accurately projects a laser image or laser template on the target workpiece based upon the as-built condition of the workpiece, including but not exclusively, modifications made to the workpiece during assembly, without requiring laborious input of further data regarding the differences between the as-designed condition of the workpiece and the actual as-built condition.

As set forth above, the method of this invention may also include locating a plurality of metrology receivers at predetermined locations relative to the digitizing system, receiving a signal from one or a plurality of metrology transmitters located at a predetermined location to the plurality of metrology receivers associated with the digitizing system and determining the precise position and orientation of the light digitizing system. In a preferred embodiment, the method also includes locating a plurality of metrology receivers at predetermined locations relative to the target workpiece and determining the precise position and orientation of a 3D digitizing system relative to the workpiece. The method of this invention may also include mounting a 3D digitizing system or digital scanner on a frame assembly and locating a plurality of metrology receivers on the scanner frame assembly and the scanner frame assembly preferably includes a plurality of photogrammetry targets opposite the digital scanner to determine the precise position and orientation of the digital scanner relative to the frame assembly.

As set forth in more detail hereinbelow, the 3D digitizing system or digital scanner may be any conventional digitizer scanner, preferably a white light digital scanner, such as presently used in industrial applications. The laser projection system may be a conventional laser projector and computer such as described, for example, in the above-referenced U.S. patent or the laser projection system may be a "targetless" laser projection system as described in the above-referenced co-pending U.S. patent application. As will be understood, the following description of the preferred embodiments are exemplary only and do not limit the scope of this invention except as set forth in the appended claims.

DESCRIPTION OF THE PREFERRED EMBODIMENTS

Figure 1:
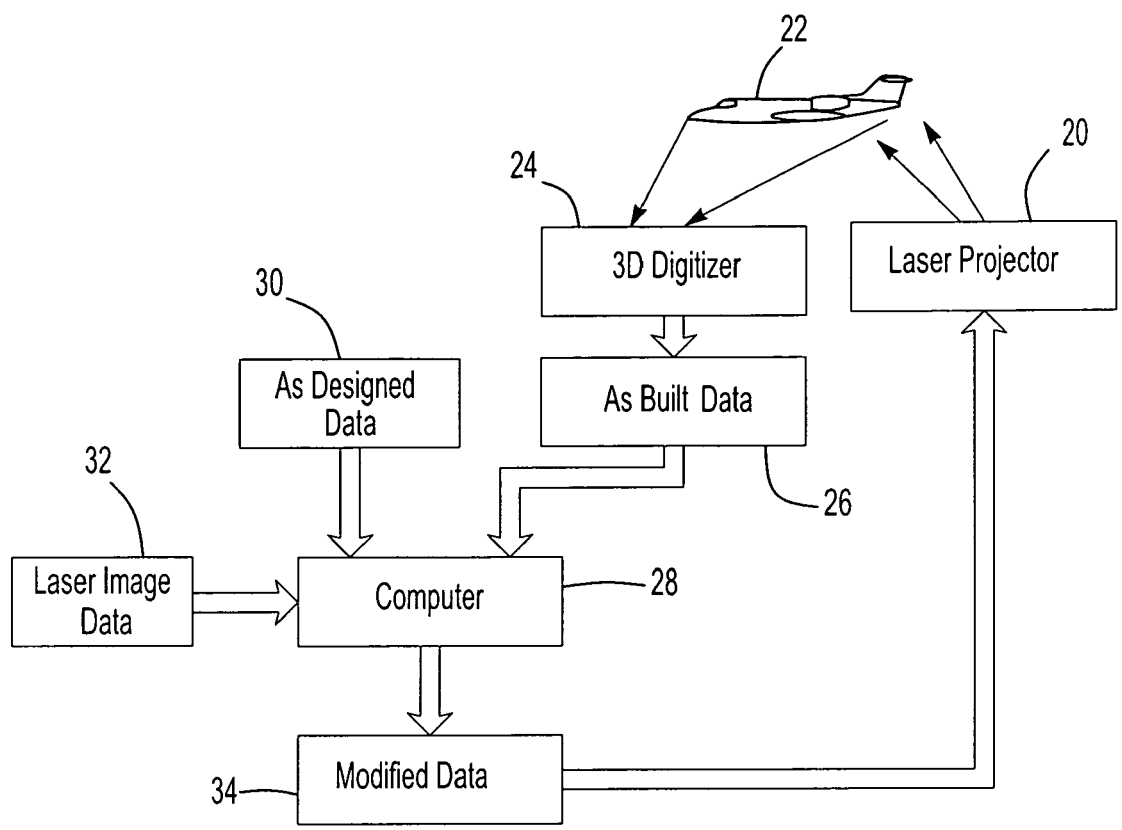
FIG. 1 is a schematic illustration or flow chart illustrating the steps of the method of this invention.

FIG. 1 may be characterized as a flow chart or block diagram illustrating a laser projection system having an intelligent data correction system and method of this invention, wherein a laser projector 20 is adapted to project a laser image, outline template on a target surface of a workpiece 22 which, in the illustrated embodiment, is an aircraft. As set forth above, the laser projection system of this invention may be utilized for projecting a laser image on any workpiece, but is particularly useful for projecting a laser image at a predetermined location and orientation on large workpieces subject to modification during construction or assembly, such that the as-built condition of the target workpiece differs from the as-designed condition of the workpiece. The first step in the method of this invention is to scan the workpiece or a predetermined portion of the workpiece with a 3D digitizing system or digitizer scanner 24, preferably a noncontact digitizer scanner, to determine the precise configuration and dimensions of the as-built condition of the workpiece 22. The data received from the 3D digitizer scanner 24 of the as-built condition of the workpiece 22 is then stored in a computer 28.

The data 30 of the as-designed condition of the workpiece 22 generally has been previously stored in the computer 28. Further, the data regarding the laser image 32 to be projected by the laser projector 20 on the workpiece 22 is also stored in the computer 28, which conventionally is included with the file of the as-designed data 30. However, the laser image data 32 may be a separate file. The computer 28 then compares the as-built data 26 of the workpiece 22 received from the 3D digitizer scanner 24 with the as-designed data 30 of the workpiece and modifies or "morphs" the as-designed data based upon the as-built data as required for the particular application. That is, the 3D digitizer scanner 24 may be controlled to scan only a portion of the workpiece 22 where the design modifications are known or the 3D digitizer scanner may scan the entire workpiece 22. The computer 28 then controls the laser projection 20 utilizing the modified data based upon the as-built condition of the workpiece to project a laser image or template on the workpiece 22 at the precise location and orientation set forth in the laser image data 32 but based upon the as-built data 26 received from the 3D digitizer scanner 24. The laser projection system of this invention thus automatically corrects for differences between the as-designed data 30 and the as-built data 26 received from the 3D digitizer scanner 24 to assure accurate placement and orientation of the laser image on the workpiece 22 where the workpiece 22 has been modified during assembly or construction.

Figure 2A:
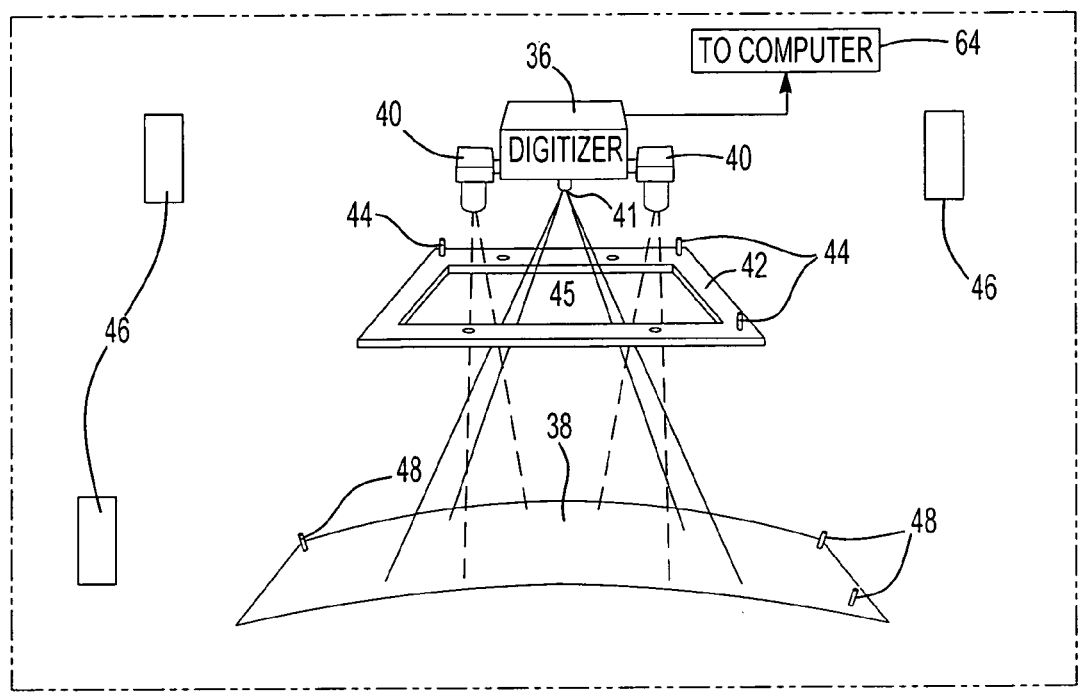
FIG. 2A is a schematic illustration of a 3D digitizer scanner mounted relative to a frame assembly and metrology system for scanning a workpiece.

FIG. 2A illustrates one preferred apparatus and method of mounting a noncontact 3D digitizing system or digitizer scanner 36 opposite a workpiece 38 which eliminates the requirement for a fixed precise location of the digitizer scanner 36 relative to the workpiece 38. As will be understood by those skilled in this art, a conventional 3D digitizer scanner typically has one or two digital cameras 40 mounted in fixed relation and orientation relative to the digitizer scanner 36 as shown in FIG. 2A. In one preferred embodiment, the digitizer scanner assembly is mounted on a frame 42 having a plurality of metrology receivers 44 which permit determination of the precise location and orientation of the 3D digitizer scanner 36 using the metrology transmitters 46. Further, the target workpiece 38 may include a second plurality of metrology receivers 48 at predetermined locations on or adjacent the target surface 38 to permit precise determination of the location and orientation of the 3D digitizer scanner 36 relative to the target workpiece 38. As will be understood by those skilled in this art, the frame assembly 42 and the target surface 38 should include at least three metrology receivers 44 and 48, respectively, and only one metrology transmitter 46 may be required for accurate determination of the location and orientation of the 3D digitizer scanner 36 relative to the target workpiece 38. The digital scanner 36 may be rigidly mounted relative to the frame 42, but in a preferred embodiment, the frame 42 also includes a plurality of photogrammetry targets 45 on the frame 42 opposite the digital scanner 36 to determine the precise location of the digital scanner 36 relative to the frame 42 and the digital scanner 36 will typically include a light 41, preferably but not necessarily a white light. Using this preferred method, the traditional use of photogrammetry targets placed on or adjacent to the target workpiece at predetermined known locations is no longer necessary to correctly align the digitizer scanner relative to the workpiece. As set forth above, the 3D digitizer scanner 36 then scans the work surface 38 to determine the as-built condition of the target workpiece 38. This has tremendous benefits for those applications where multiple positions of the digitizing system are required to digitize large or complex parts and correctly stitch point cloud patches from each scanner positions.

Figure 2B:
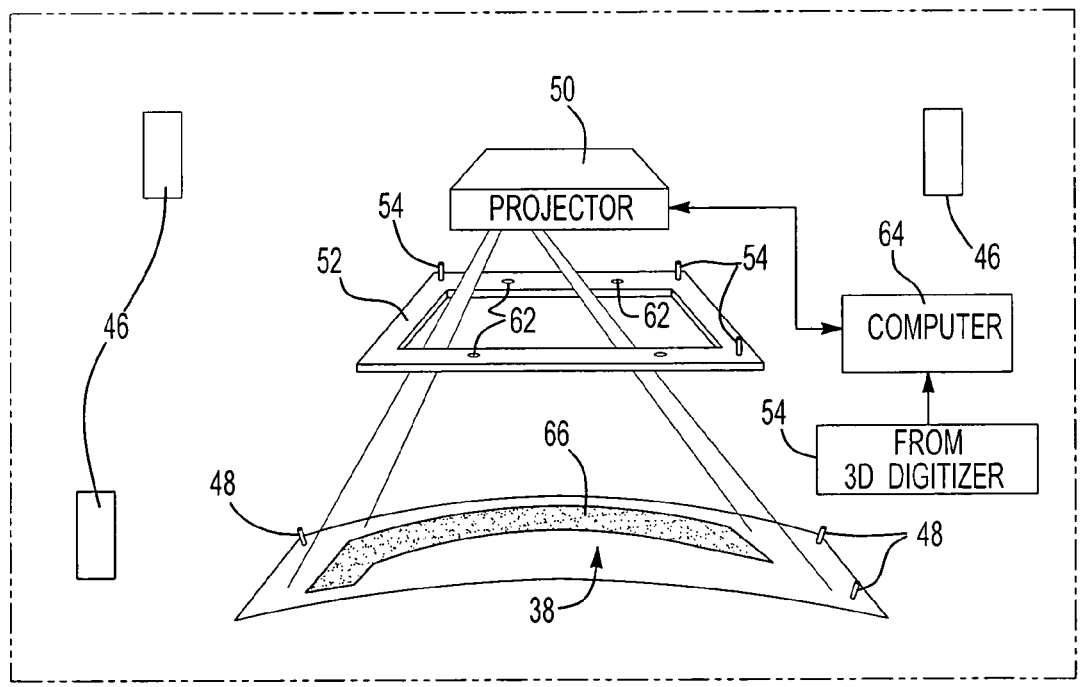
FIG. 2B is a schematic illustration of a laser projector for projecting a laser image on a workpiece also mounted on frame assembly with a metrology system.

FIG. 2B illustrates a similar assembly for a laser projector 50 which may be mounted on a frame assembly 52 having a plurality of metrology receivers 54. As described above with regard to FIG. 2A, the target surface 38 may also include a second plurality of metrology receivers 48 and the precise location and orientation of the laser projector 50 relative to the target workpiece 38 may then be precisely determined by the laser projector 46. In this embodiment, the frame assembly 52 further includes a plurality of laser targets 62 which are periodically or continuously scanned by the laser projector 50 to determine the precise location of the laser projector 50 relative to the frame assembly 52.

As set forth above, the data 54 (FIG. 2B) of the as-built condition of the target workpiece 38 is then transferred to and stored in a computer 64 and the computer 64 then compares the data 30 of the as-designed condition of the target workpiece (FIG. 1) with the data 54 of the as-built condition of the workpiece 38 and modifies or morphs the data of the as-designed condition of the workpiece and the laser image data 32 (FIG. 1) to control the laser projector 50 shown in FIG. 2B to project a laser image or template 66 on the target workpiece 38 at the precise location and orientation required for the application. The laser projection system illustrated in FIGS. 2A and 2B thus includes an intelligent data correction system to project a laser image, outline or template 66 on the target workpiece based upon the as-built condition of the target workpiece 38, although the target workpiece 38 may have been modified during construction or assembly. For example, the curvature or size of the target workpiece 38 may have been modified from the as-designed condition.

The laser projector 20 in FIG. 1 and 50 in FIG. 2B may be any conventional laser projector, such as the LPS1 laser projector available from the assignee of this application. The metrology transmitters 46 shown in FIGS. 2A and 2B are located at fixed locations, preferably within the work area. The metrology transmitters 46 and metrology receivers 44, 48 and 54 may be indoor global positioning systems (GPS) infrared light metrology transmitters and receivers available from Arc Second, Inc. of Dulles, Va. or laser trackers. Alternatively, other metrology devices may also be used including, but not limited to laser theodelite transmitter tracking devices, optical photogrammetry devices, camera base systems, other infrared transmitter metrology devices and other tracker projection devices. As set forth above, the 3D digitizer scanner may also be any conventional digitizer scanner available, for example, from GOM GmbH of Braunschweig, Germany, MetricVision of Newington, Va. and other sources. Although a "targetless" digitizer scanner and laser projection system as shown in FIGS. 2A and 2B is preferred for large target workpieces, a more conventional 3D digital scanner or noncontact 3D digitizing system and laser projection assembly may also be utilized in the apparatus and method of this invention, wherein a 3D digitizing system is mounted opposite the workpiece 38 to scan the as-built condition of the workpiece and the laser projector 50 may be mounted opposite the workpiece 38 and laser targets or reflectors may be mounted on or adjacent the target workpiece 38 at predetermined known locations, particularly but not exclusively for smaller workpieces.

FIGS. 3A, 3B, 4A and 4B illustrate one embodiment of a frame assembly 70 for a 3D digitizer scanner or digitizing system 74 (shown at 36 in FIG. 2A) and a laser projector 76 (shown at 50 in FIG. 2B). The disclosed embodiment of the frame assembly 70 includes a proximal end 72 and an open distal end 74. As used herein, for reference purposes only, the proximal end 72 of the frame assembly 70 is closest to the 3D digitizer scanner 74 in FIGS. 3A and 3B or the laser projector 76 in FIGS. 4A and 4B and the open distal end 74 is furthest from the 3D digital scanner 74 or the laser projector 76. In the disclosed embodiment, the open distal end 74 is rectangular having a plurality of metrology receivers surrounding the open distal end 74, which are also shown at 44 in FIG. 2A and at 54 in FIG. 2B. However, the frame assembly 70 may be any convenient shape, but the distal end 74 is preferably open. As described above, the metrology transmitters 46 shown in FIGS. 2A and 2B transmit a signal, such as an infrared laser light signal, to the plurality of metrology receivers 78 located at fixed locations and orientations relative to the 3D digitizer scanner 74 shown in FIGS. 3A and 3B and the laser projector 76 shown in FIGS. 4A and 4B to determine the precise position and orientation of the 3D digitizer scanner 74 and the laser projector 76. Where the laser projection system of this invention including an intelligent data correction system is a targetless laser projection system as described above, the target workpiece or target surface 38 in FIGS. 2A and 2B also include preferably a plurality of metrology receivers 48, such that the metrology transmitters 46 can accurately determine the position and orientation of the 3D digitizer scanner 74 and the laser projector 76 relative to the workpiece or work surface 38.

In the disclosed embodiment of the frame assembly 70, the proximal end 72 is supported on a universal support joint 80 which permits movement and rotation of the frame assembly 70 in at least two axes. The disclosed embodiment of the universal joint 80 includes support brackets 86 affixed to the support plate 82 which receive a primary pin or pivot rod 88 and the pivot rod 88 includes a cross rod 90 which is pivotally supported on the brackets 86. A support bracket 92 is pivotally supported on the cross rod 90, such that the frame assembly may be pivoted or rotated about the axes of the pivot rod 88 and the cross rod 90 to adjust the orientation of the frame assembly and thus the 3D digitizer scanner 74 and the laser projector 76 relative to the target workpiece. The frame assembly may be supported by the universal support 80 on any suitable support, including the ceiling of a work area, carts or stanchions. In the disclosed embodiment, the frame assembly 70 includes opposed side members or panels 94, end members or panels 96, an end frame member 98 surrounding the distal open end 74 shown in FIGS. 3A and 4A and the support plate 82. The frame assembly 70 is preferably formed of a material which has a low co-efficient of expansion and contraction, such as a honeycomb carbon fiber. The frame assembly 70 is also preferably integrally formed, such that the metrology receivers 78 affixed to the end frame member 98 are accurately positioned relative to the 3D digitizer scanner 74 shown in FIGS. 3A and 3B and the laser projector 76 shown in FIGS. 4A and 4B.

Figure 3A:
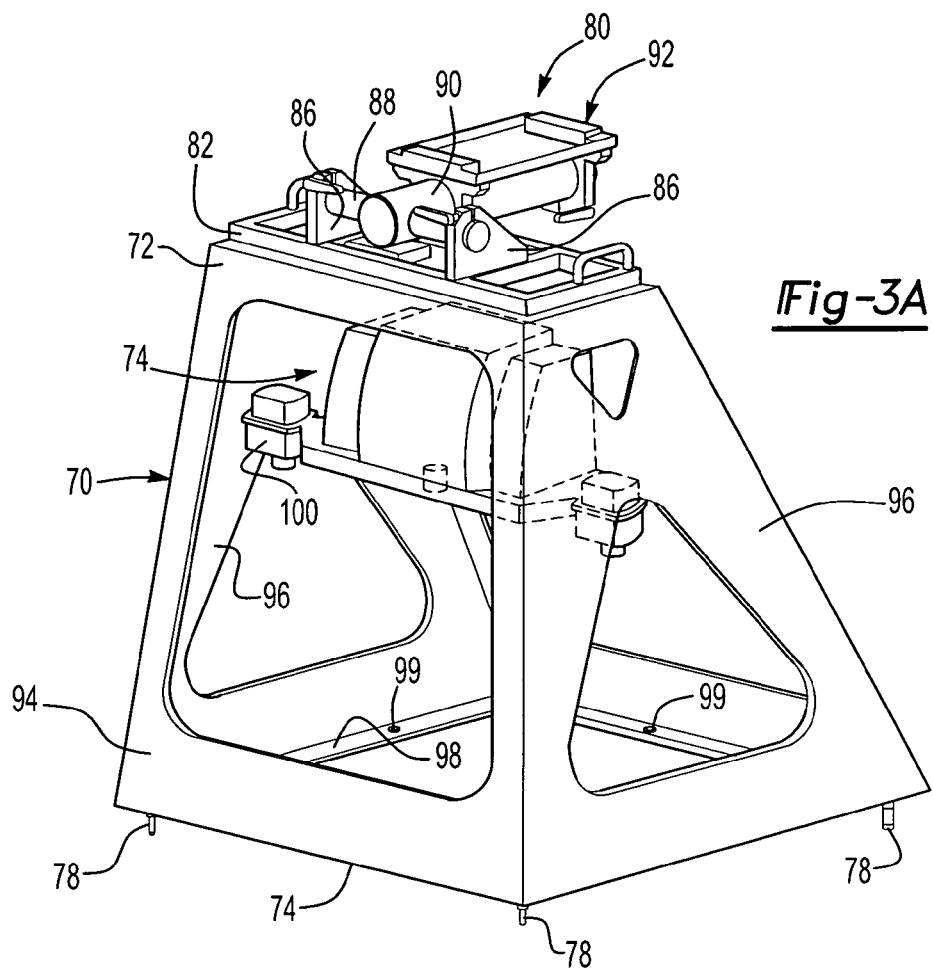
FIGS. 3A and 3B illustrate one embodiment of a noncontact 3D digitizing system or scanner mounted on a frame assembly.
Figure 3B:
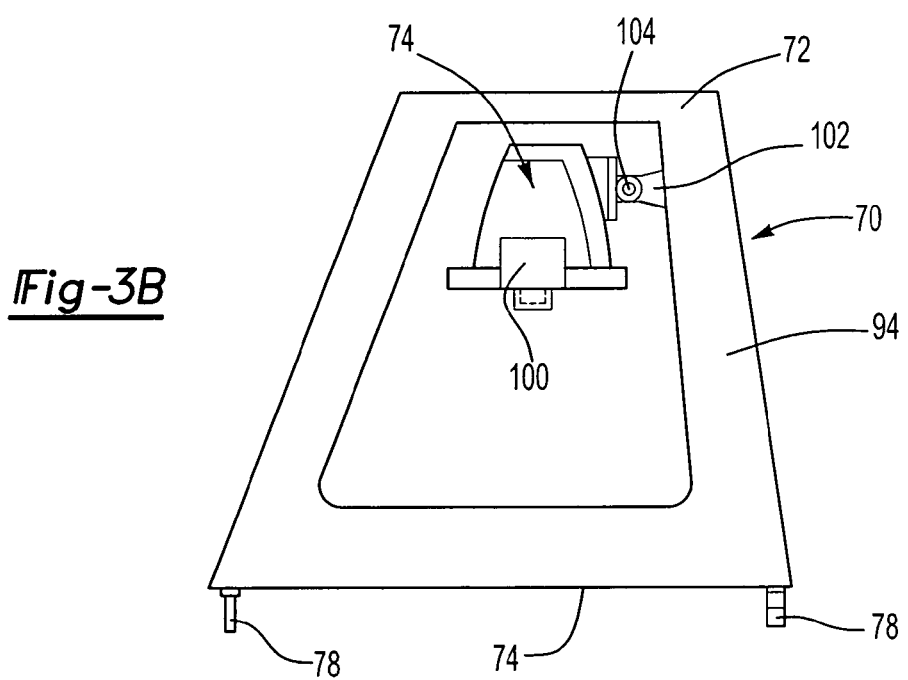

As set forth above, the digitizer scanner or digitizing system 74 shown in FIGS. 3A and 3B may be any conventional digitizing system which typically includes one or two digital cameras 100 as shown. In the disclosed embodiment of the method of this invention, the digital scanner 74 scans the workpiece to determine the as-built condition of the workpiece as described above. In the disclosed embodiment, the 3D digital scanner 74 is mounted on bracket plates 102 as shown in FIG. 3B. The bracket plates 102 include a pivot pin or rod 104. In a preferred embodiment of the digitizer scanner frame assembly shown in FIG. 3A, the open end 74 of the frame 70 includes a surface 98 opposite the digitizer scanner 74 having a plurality of reflective photogrammetry targets 99 which are scanned by the digital cameras 100 to determine the precise position and orientation of the digital scanner 74 relative to the frame assembly 70, eliminating the requirement for the digitizer scanner to scan photogrammetry targets on the target surface, and permitting relative movement of the digital scanner and the target surface. Alternatively, the digitizer scanner 74 may be fixed at a predetermined location and orientation relative to the frame assembly 70. Thus, in a preferred embodiment, the precise location and orientation of the frame assembly 70 may be determined by the metrology receivers 78 and the precise position and orientation of the digital scanner 74 relative to the frame assembly 70 may be determined by scanning the photogrammetry targets 99, such that the precise position and orientation of the digital scanner 74 may be determined relative to the target workpiece.

Figure 4A:
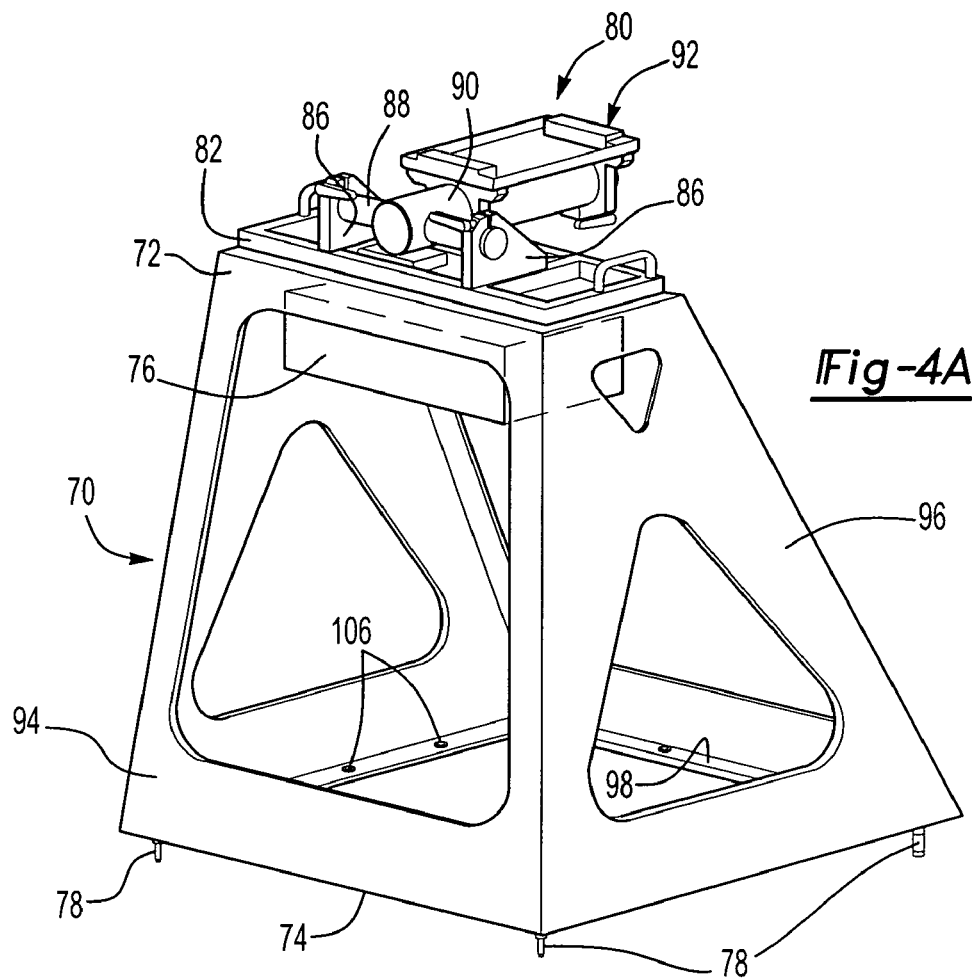
FIGS. 4A and 4B illustrate a laser projector mounted on a frame assembly.
Figure 4B:
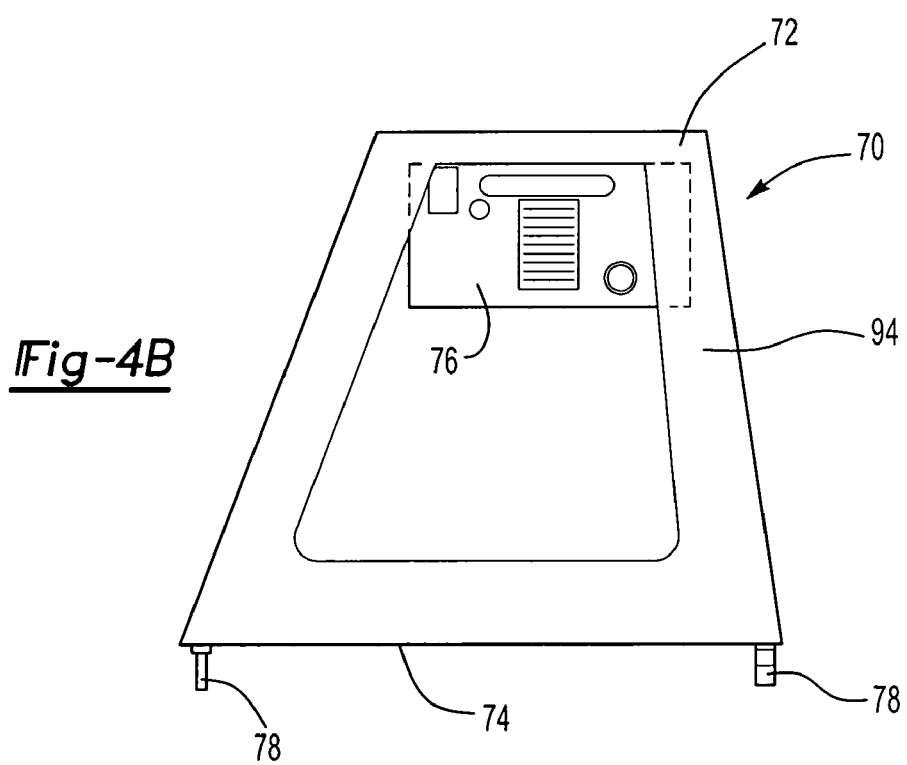

The laser projector 76 shown in FIGS. 4A and 4B may be mounted to the support plate 82 and in the disclosed embodiment, the end frame member 98 which surrounds the open distal end 74 of the frame assembly includes a plurality of retroreflective laser targets 106 which may be continuously or periodically scanned by the laser projector 76 to accurately determine the relative position of the laser projector 76 relative to the frame assembly 70 and correct for any drift or movement of the laser. As set forth above, the laser projector 76 projects a laser template or laser image on the target workpiece or surface, such as the laser image 66 projected by the laser projector 50 on the workpiece 38 shown in FIG. 2B.

Figure 5:
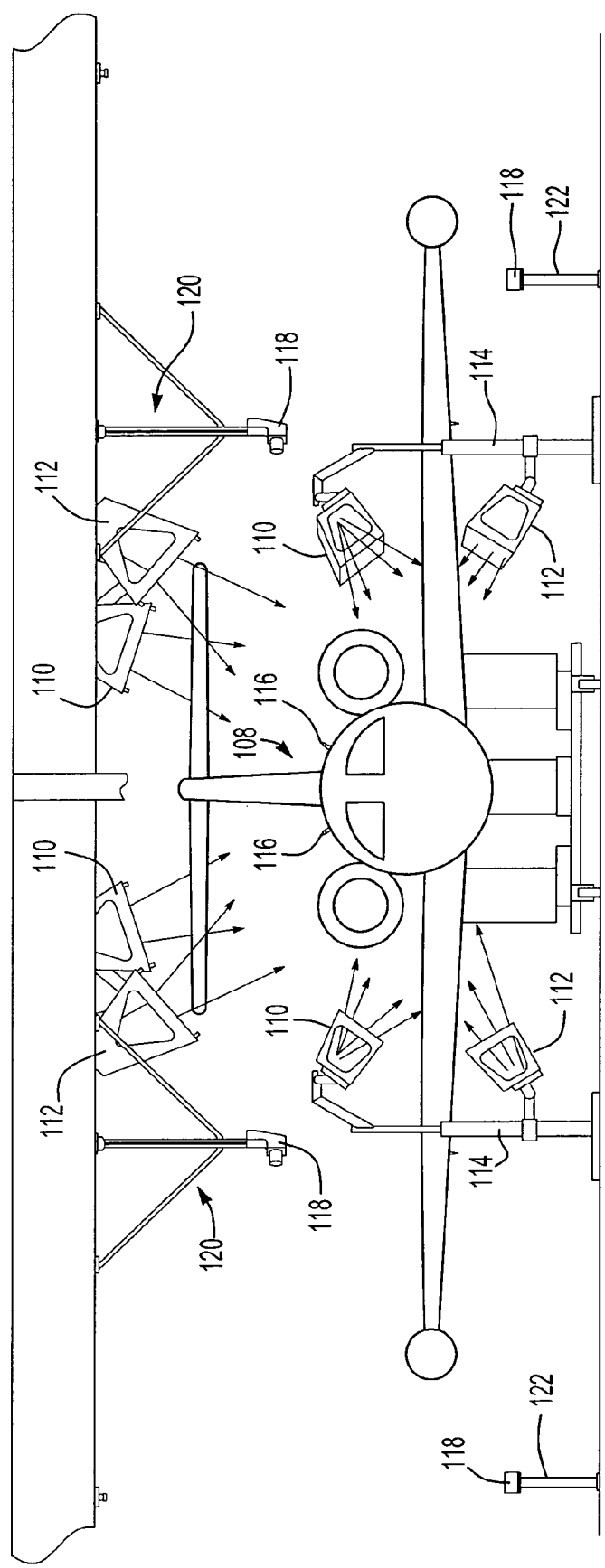
FIG. 5 illustrates one embodiment of a laser projection system of this invention.

FIG. 5 illustrates one practical application of the laser projection system including an intelligent data correction system and method of this invention utilized to project a laser image or laser template on an aircraft 108, which is the target workpiece in this application. In the application of this invention shown in FIG. 5, a plurality of frame assemblies 110 support 3D digitizer scanners and a plurality of frame assemblies 112 support laser projectors as shown in FIGS. 3A, B, 4A and 4B which are directed toward the aircraft 108, wherein the digital scanners in frame assemblies 110 first scan the aircraft 108 to determine the as-built condition of the aircraft and a plurality of laser projectors supported on frame assemblies 112 project a laser image or laser template on the aircraft 108. As set forth above, the laser image projected by the laser projectors may be utilized to project a laser template for painting, application of decals or for assembly of components, ply overlays or any other applications for accurate placement on the aircraft 108. As will be understood, the actual application may include several other frame assemblies supporting 3D digitizer scanners and laser projectors in addition to those shown in FIG. 5 to either provide a complete digital scan of the aircraft 108 or for projecting laser images in other locations on the aircraft. The disclosed embodiment includes frame assemblies mounted on the ceiling beams above the aircraft and frame assemblies 110 and 112 mounted on adjustable stanchions 114.

The application of this invention, shown in FIG. 5 is also a targetless laser projection system, wherein the aircraft 108 includes a plurality of metrology receivers 116 (only two of which are shown for illustrative purposes) at predetermined known locations and a plurality of metrology transmitters 118 are also located at predetermined known locations to determine the precise location and orientation of the aircraft 108 and the location and orientation of the 3D digitizer scanners mounted on frame assemblies 110 and laser projectors mounted on frame assemblies 112. The metrology transmitters 118 may be mounted on bracket assemblies 120 supported from the ceiling of the work area or on stanchions 122 supported on the work floor as disclosed in more detail in the above-referenced co-pending application, the disclosure of which is incorporated herein.

The method of projecting a laser image or laser template on a target workpiece at predetermined locations based upon the as-built condition of the target workpiece may now be understood from the above description of the preferred embodiments of the laser projection system. As set forth above, the apparatus includes a computer 28 as shown in FIG. 1, wherein the method of this invention includes storing data 30 in the computer 28 of an as-designed condition of the workpiece and data 32 of a laser image to be projected on the target workpiece based upon the as-designed condition of the workpiece. Typically, the as-designed condition of the workpiece is obtained from engineering models or the workpiece may also be computer designed. However, as set forth above, the as-built condition of the workpiece often differs from the as-built condition, particularly but not exclusively for large parts and assemblies, such as an aircraft. The method of this invention further includes scanning the target workpiece, preferably with a noncontact 3D digitizing system 24 or more preferably with a white light digitizing system to determine the as-built condition of the target workpiece. However, as stated above, any digitizing system may be used. The method of this invention then includes storing the data 26 of the as-built condition of the workpiece from the digital scanner in the computer and comparing the data 26 of the as-built condition of the workpiece with the data 30 of the as-designed condition of the workpiece and modifying or morphing the data of the as-designed condition of the workpiece to correspond to the as-built condition of the workpiece and the data regarding the laser image to correspond to the as-built condition of the workpiece. The final step is then controlling the laser projector to project a laser image or laser template on the workpiece based upon the as-built condition of the workpiece at a predetermined location and orientation based upon the original data of the laser image.

In one preferred embodiment of the method of this invention, the method includes locating a plurality of metrology receivers at predetermined locations relative to the 3D digitizer scanner and transmitting a signal from a metrology transmitter or metrology transmitters located at predetermined locations to the plurality of metrology receivers and then determining the precise position and orientation of the 3D digitizing system(s). In this targetless laser projection system, the method may also include locating a plurality of metrology receivers at known predetermined locations relative to the target workpiece and determining the precise position and orientation of the 3D digitizing system or digitizer scanner relative to the target workpiece, permitting relative movement between the digitizing systems and the workpiece. In the disclosed embodiment of the method of this invention, the method further includes mounting the digitizer scanner on a frame assembly and mounting the plurality of metrology receivers on the frame assembly as described above.

The following is one example of a method of utilizing the laser projection system having an intelligent data correction system and method of this invention to correct for variations between a Computer Aided Design (CAD) design model and the actual geometric condition of the target workpiece which, as set forth above, may be any part or assembly. The following steps may be utilized to correct for discrepancies between the target workpiece as-designed condition with the target workpiece in the as-built condition:

1. Import the CAD Engineering Design Model into the computer that characterizes the designed or ideal design intent of the target workpiece, referred to herein as the "as-designed condition."
2. Teach a scan path that defines the area or areas for which a laser template or laser projection is needed. This is an optional step which may be utilized where the changes in the as-designed condition are known and which minimizes the amount of data that needs to be collected. Further, this step is specifically for steerable scanners or for manually pointed scanners that are instrumented with position feedback. This step can be accomplished by either instructions to the operator or may be included in the software in the computer.
3. Generate a point cloud from a digitizing scanner system that characterizes the workpiece in the manufactured condition, referred to herein as the "as-built condition" by scanning the workpiece or portions of the workpiece as defined in step 2. The point cloud data is then imported into the computer.

4. Apply algorithms in the computer to generate an optimized polygonal mesh from the scanned point cloud data obtained in step 2 to derive an approximated as-built surface representation.
5. Perform a best fit (least squares or other method) of the inspection (mesh surface) data to the as-designed CAD data maintaining the engineered design model coordinate system.
6. Import the as-built laser projection control file which includes the 3D coordinate data polylines that define the laser projection path. Alternatively, this coordinate data can be derived by selecting directly the source CAD elements that represent the projection polylines provided this information is obtained in the engineering design model. It should be noted that the unit surface normals for all polyline coordinates should be included in the projection control file or derived from the associated CAD model entities.
7. Quantify the as-built versus the as-designed variations for all areas scanned by the 3D digitizing system. This is used primarily for quality archiving and to determine if the magnitude of the variations is within the user supplied acceptable limits. This step is accomplished by first reporting graphically and quantitatively (error report) the variations between each vertice of the as-designed CAD model and the as-built (scanned) mesh surface by reporting the absolute distance between each of the CAD vertice points and its associated mesh pierce point. It should be noted that the CAD mesh pierce points are generated by first creating and then extending a composite normal vector from each vertice and intersecting it with the mesh surface created by the scanned data. A composite normal vector is defined normal to a derived surface which is calculated to minimize the angular deviation between the derived surface and all facet surfaces surrounding the vertice. Second, this step includes evaluating the linear distances (errors) reported above between each CAD mesh pierce point and the nearest CAD vertice against predetermined tolerance settings to determine if the intelligent data correction system should continue. A color coated whisker plot could be used to graphically identify regions where the calculated variation (error) is outside of the tolerance limits.
8. Quantify the as-built versus the as-designed variations for all laser projection polylines within the original source projection file. This is accomplished by first graphically and quantitatively reporting the variation between each point in the source laser projection control file and its associated mesh pierce point of the original source projection file by extending the existing polyline coordinate normal and calculating its intersection with the scan derived mesh and second evaluating the linear distances (errors) reported in this step between each source projection file mesh pierce point and its associated laser projection file coordinate against predetermined tolerance settings to determine if the process should continue.
9. Create a new "as-built" laser projection control file containing an identical structure to the original "as-designed" laser projection control file and within the new as-built projection control file, replace all as-designed projection control file polyline coordinates with their associated original source projection mesh pierce point coordinates.
10. Post-process the new laser projection control file and load it into the computer of the laser projection system.
11. Project the "corrected" as-built laser projection control file polyline coordinates on the target workpiece.

As will be understood by those skilled in this art, the above method of utilizing the laser projection system and method of this invention and is provided solely as an example of one method of utilizing the laser projection system having an intelligent data correction system of this invention.

Having described preferred embodiments of a laser projection system, an intelligent data correction system and method of this invention, it will be understood that various modifications may be made to the apparatus and method of this invention within the purview of the appended claims. For example, the laser projection system and method of this invention may be utilized without metrology transmitters and metrology receivers, wherein a conventional laser projection system as disclosed in the above-referenced patent is utilized having laser targets or laser sensors at predetermined locations on or adjacent the target workpiece and a conventional 3D digitizing system is used to determine the as-built condition of the workpiece. However, because the laser projection system and method of this invention is particularly suitable for larger workpieces and assemblies, such as an aircraft, a targetless laser system is preferred for such applications. Further, any conventional digitizing system may be utilized with the laser projection system and method of this invention provided the digitizing system may be utilized to accurately determine the as-built condition of the workpiece. Further, as set forth above, in some applications, the data of the laser projection to be projected on the target workpiece based upon the as-designed condition of the target workpiece will be sufficient without importing the data of the as-designed condition of the workpiece in the computer to accurately project a laser projection on the target workpiece. Any digitizing system may also be utilized in the method and apparatus of this invention as set forth above. As will be understood from the above description of a preferred embodiment of the laser projection system and method of this invention, the apparatus and method of this invention has particular advantages for a three dimensional laser projection system including a 3D digitizing system, the method and apparatus of this invention may also be utilized for a two dimensional system wherein the target workpiece is planar. Finally, as set forth above, the laser projection system and method of this invention may be utilized to correct for differences between the as-built condition and the as-designed condition of any workpiece and is not limited to aircraft or other large constructions or assemblies.

The invention claimed is:

1. A laser projection system including an intelligent data correction system, comprising:
 a digitizing system determining an as-built condition of a target workpiece;
 a computer receiving data of a laser projection to be projected on said target workpiece based upon an as-designed condition of said target workpiece and data from said digitizing system of said as-built condition of said workpiece, said computer modifying said data of said laser projection based upon said as-built condition of said workpiece; and
 a laser projector receiving data from said computer of a laser projection based upon said as-built condition of said target workpiece and projecting a laser projection on said target workpiece.

2. The laser projection system as defined in claim 1, wherein said digitizing system is a digitizer scanner scanning said target workpiece and determining said as-built condition of said target workpiece and said computer receiving data of said as-designed condition of said target workpiece and modifying said data of said as-designed condition of said target workpiece to correspond to said data of said as-built condition of said target workpiece.

3. The laser projection system as defined in claim 1, wherein said laser projector is mounted on a frame assembly opposite said target workpiece, said frame assembly including a plurality of metrology receivers receiving a signal from at least one metrology transmitter at a predetermined known location to determine a precise location and orientation of said laser projector in three dimensions.

4. The laser projection system as defined in claim 3, wherein said target workpiece also includes a plurality of metrology receivers at predetermined known locations relative to said target workpiece to determine a position and orientation of said laser projector relative to said target workpiece in three dimensions.

5. The laser projection system as defined in claim 4, wherein said laser projector is mounted on a frame assembly opposite said target workpiece, said frame assembly including a plurality of metrology receivers receiving a signal from said metrology transmitter to determine a precise position and orientation of said laser projector relative to said digitizing system and said target workpiece.

6. The laser projection system as defined in claim 1, wherein said digitizing system is a three dimensional light digitizing system.

7. The laser projection system as defined in claim 1, wherein said digitizing system is a three dimensional white light digitizing system.

8. The laser projection system as defined in claim 1, wherein said digitizing system is a frequency modulated coherent laser radar system.

9. The laser projection system as defined in claim 1, wherein said digitizing system is a three dimensional camera based photogrammetry system.

10. A laser projection system including an intelligent data correction system, comprising:
   a digitizing system determining an as-built condition of a target workpiece;
   a computer receiving data of an as-designed condition of said target workpiece and receiving data from said digitizing system of said as-built condition of said target workpiece, said computer then comparing said data of said as-built condition of said target workpiece with said data of said as-designed condition of said target workpiece and modifying said data of said as-designed condition of said target workpiece to correspond to said data of said as-built condition of said workpiece;
   said computer further receiving data of a laser projection to be projected on said target workpiece based upon said as-designed condition of said target workpiece and modifying said data of said laser projection based upon said as-built condition of said workpiece; and
   a laser projector receiving data from said computer of a laser projection based upon said as-built condition of said target workpiece and projecting a laser projection on said target workpiece.

11. The laser projection system as defined in claim 10, wherein said digitizing system is mounted on a frame assembly opposite said target workpiece, said frame assembly including a plurality of metrology receivers receiving a signal from a at least one metrology transmitter at a predetermined known location to determine a precise location and orientation of said digitizing system in three dimensions.

12. The laser projection system as defined in claim 11, wherein said target workpiece also includes a plurality of metrology receivers at predetermined known locations relative to said target workpiece to determine a position and orientation of said digitizer system relative to said target workpiece in three dimensions.

13. The laser projection system as defined in claim 12, wherein said laser projector is mounted on a frame assembly opposite said target workpiece, said frame assembly including a plurality of metrology receivers receiving a signal from said metrology transmitter to determine a precise position and orientation of said laser projector relative to said digitizing system and said target workpiece.

14. The laser projection system as defined in claim 10, wherein said digitizing system is a three dimensional light digitizing system.

15. The laser projection system as defined in claim 10, wherein said digitizing system is a three dimensional white light digitizing system.

16. The laser projection system as defined in claim 10, wherein said digitizing system is a frequency modulated coherent laser radar system.

17. The laser projection system as defined in claim 10, wherein said digitizing system is a three dimensional camera based photogrammetry system.

18. An intelligent data correction system correcting data for projecting a laser based image based upon an as-designed condition of a workpiece to an as-built condition of said workpiece, comprising:
   said workpiece including a first plurality of metrology receivers located relative to said workpiece at predetermined known locations;
   a digitizing system located opposite said workpiece mounted on a frame assembly having a second plurality of metrology receivers mounted on said frame assembly and photogrammetry targets mounted on said frame assembly opposite said digitizing system;
   at least one metrology transmitter within a field of view of said first and second plurality of metrology receivers;
   a computer receiving data for projecting a laser image on said workpiece at a predetermined location based upon said as-designed condition of said workpiece and data from said digitizing system of said as-built condition of said workpiece, said computer then comparing said data of said as-built condition of said workpiece with said data of said as-designed condition of said workpiece and modifying said data of said as-designed condition of said workpiece to correspond to said data of said as-built condition of said workpiece; and
   a laser projector receiving data from said computer for projecting an image upon said workpiece based upon said as-built condition and said laser projector projecting a laser image on said workpiece at said predetermined position.

19. The intelligent data correction system as defined in claim 18, wherein said frame assembly includes a proximal end receiving said digitizing system, an open distal end and said second plurality of metrology receivers are mounted on said open distal end of said frame assembly.

20. The intelligent data correction system as defined in claim 18, wherein said digitizing system is a three dimensional frequency modulated coherent laser radar device.

21. The intelligent data correction system as defined in claim 18, wherein said digitizing system is a three dimensional digital camera based digitizing system.

22. A method of projecting a laser image on a target workpiece at a predetermined location on said target workpiece based upon the as-built condition of said target workpiece, comprising the following steps:

determining an as-built condition of said target workpiece;

importing data to a computer relative to an as-designed condition of said target workpiece, said computer then comparing said data of said as-designed condition of said workpiece with data received from said digitizing system of said as-built condition of said target workpiece and modifying said data of said as-designed target workpiece to correspond to said data of said as-built condition of said target workpiece;

accessing data in said computer of a laser image to be projected on said target workpiece at said predetermined location based upon said as-designed condition of said workpiece, said computer then modifying said data of said laser image based upon said data of said as-built condition of said target workpiece; and controlling said laser projector to protect said laser image at said predetermined location on said target workpiece based upon data received from said computer of said laser image based upon said data of said as-built condition of said target workpiece.

23. The method as defined in claim 22, wherein said method includes locating a plurality of metrology receivers at predetermined locations relative to said digitizing system, transmitting a signal from a metrology transmitter located at a predetermined location to said plurality of metrology receivers and determining the precise position and orientation of said noncontact digitizing system.

24. The method as defined in claim 23, wherein said method includes locating a plurality of metrology receivers at predetermined locations relative to said target workpiece and determining the precise position and orientation of said digitizing system relative to said target workpiece prior to controlling said laser projector to project said laser image at said predetermined location on said target workpiece.

25. The method as defined in claim 22, wherein said method includes mounting said light digitizing system on a frame assembly opposite said target surface and mounting said metrology receivers on said frame assembly at predetermined locations relative to said digitizing system.

26. The method as defined in claim 22, wherein said method includes locating a plurality of metrology receivers at predetermined locations relative to said laser projector, transmitting a signal from said metrology transmitter to said plurality of metrology receivers at predetermined locations relative to said laser projector and determining the position and orientation of said laser projector relative to said digitizing system.

* * * * *